Patented Sept. 21, 1943

2,330,077

UNITED STATES PATENT OFFICE 2,330,077

METHOD FOR RECOVERING ACID FROM PETROLEUM SLUDGES

John A. O'Dell, Baytown, Tex.

No Drawing. Application December 28, 1939,
Serial No. 311,321

11 Claims. (Cl. 23—173)

The present invention is directed to a method for recovering sulphuric acid from petroleum sludges derived from oils which have been treated with sulphuric acid.

One of the most common operations in petroleum refining is the treatment of oil with sulphuric acid. In all such treatments there is formed a sludge composed of sulphuric acid and certain components of the oil which has been treated as well as certain chemical combinations of sulphuric acid and such components. The economical separation of acid from such sludges has long been recognized as an important problem in the industry. Ordinarily this is accomplished by hydrolysis by which is meant the dilution of the sludge with water and agitation of the mixture with steam or air. The heat of dilution by the water added for hydrolysis and the heating effect of steam are important factors since it is desirable to have elevated temperatures to facilitate separation of oil and acid.

Many acid sludges, such as those resulting from the conventional acid treatment of Coastal oils, are usually relatively amenable to conventional hydrolysis and readily yield up a satisfactory percentage of the sludge acid. There are certain stocks, however, such as the crude from the deep sand in Reagan County, Texas, which yield a sludge upon acid treatment which does not respond readily to conventional hydrolysis. In recent years the practice has been adopted of diluting lube oil stocks with propane for the purpose of subjecting these stocks to acid treatment. The sludges obtained from such mixtures appear to be extremely refractory and do not respond to the conventional hydrolysis. Rather, on such sludges the hydrolysis results in the formation of extremely stable emulsions which cannot be resolved into their component parts even on the application of elevated temperatures.

According to the present invention, sulphuric acid is recovered from acid sludges resulting from the treatment of petroleum with acid, which do not respond to the conventional hydrolysis, by carrying out the hydrolysis in the presence of a fluxing agent and adding to the reaction mixture a water-soluble agent capable of demulsifying water-in-oil emulsions.

The demulsifying agent may be any one of the countless water-soluble demulsifying agents known to the art. For convenience, and by reason of ready availability, it is preferred to use those water-soluble demulsifying agents which are obtained by the sulfonation of mineral oils. It is important to note that these demulsifying agents cannot be formed in situ in the sludge, which contains sulphuric acid, by adding mineral oil and heating to sulfonation temperature. For satisfactory results these mineral oil sulfonates must be preformed before addition to the sludge.

The fluxing agent employed is preferably a hydrocarbon material which will not boil to any substantial extent at temperatures encountered in the sludge treating operation, which may be as high as 250° F. As a suitable material may be mentioned heavy naphtha.

Both the fluxing agent and the demulsifying agent are necessary to the success of the operation. For example, if the sludge is fluxed with naphtha bottoms and hydrolyzed without addition of a demulsifying agent, no or only slight separation of oil and acid is effected. Conversely, if the unfluxed material is hydrolyzed and then a demulsifying agent is added, the mixture remains a stable emulsion with little separation into its component parts.

In the practice of the method of the present invention, the sludge obtained is mixed with a suitable amount of fluxing agent, which in practice may be from 20 to about 150% by volume of the sludge, depending on the character of the latter, and which is preferably between 100 and 135% by volume of the unfluxed sludge. To put it another way, suitable separation has been obtained when sufficient flux has been employed to give the mixture a viscosity of 50–70 seconds furol at 122° F.

The fluxed mixture is then heated, preferably with open steam, to a temperature in the neighborhood, or somewhat in excess of 200° F., and sufficient water is added to produce a recovered acid of the desired strength, which is usually about 30° Bé. The amount of water to be added for this purpose in connection with any given sludge will, of course, be determined by a few preliminary experiments.

In the former conventional hydrolysis it was customary to add the sludge directly to heated water. In the practice of the present invention it is preferable to heat the fluxed sludge first to a temperature of say between about 230–235° F. and then add the water to the mixture for hydrolysis. In connection with sludges resulting from propane treating it is preferred to add at least part of the fluxing agent before the sludge is depropanized. The addition of the flux may occur in stages, part being added before depropanization and more being added when the sludge is transferred to the hydrolysis vessel.

After the water has been added, a suitable quantity of demulsifying agent is added to the mixture. The quantity of agent added will vary with individual cases and will generally lie in the range of 1-25% (by volume) of the unfluxed sludge. Following the addition of the demulsifying agent the mixture is preferably agitated and heated further with open steam for a short period and then allowed to settle. Settling will ordinarily be complete in two to four hours when the mixture will be resolved into three layers. The upper layer is oil which, after neutralization, is suitable for use as commercial fuel. The bottom layer is dilute acid which is withdrawn for concentration. The middle layer contains substantially all of the demulsifying agent added together with organic constituents, the mixture forming a heavy residual sludge which occurs at the interface of the oil-acid layer.

If desired, the heavy sludge layer can be used again for another batch of sluge to be treated for acid recovery. It is ordinarily not as effective for demulsifying purposes as the mineral oil sulfonic bodies initially added, but its effectiveness can be augmented by the addition thereto of further quantities of mineral oil sulfonates. In this connection it may be noted that the mineral oil sulfonic bodies used for the purpose of the present invention need not be subjected to the purification steps that are ordinarily necessary for the preparation of such bodies for demulsification purposes. It may also be noted that the sulfonated material obtained by reacting sulfuric acid with extracts of coastal lube oils, obtained by treatment of such oils with selected solvents, such as phenol, are particularly effective for the purpose of the present invention.

As a specific example of the operation of the process of the present invention, sufficient light flux, such as bottoms resulting from the distillation of acid treated cracked naphtha, is added to the acid sludge, resulting from the treatment of a lube oil stock of Mid-Continent origin with sulphuric acid in the presence of propane, before depropanization to render the depropanized sludge pumpable. This particular flux has the virtue of being free from constitutents which are reactive with sulphuric acid. The amount of flux added may vary in quantity between 20% and 125% of the depropanized unfluxed sludge. The mixture is then heated to drive off the propane and the residue is pumped to a kettle where further flux is added if desired. The fluxed material is heated with open steam to 180-240° F. and sufficient water is added for hydrolysis to give a separated acid of desired strength, usually 20-30° Bé. Following the heating and hydrolysis steps, approximately 18% by volume, based on the unfluxed sludge, of a demulsifying agent, such as an unfinished sulphonated oil, is added to effect a resolution of the emulsion resulting from the hydrolysis of the sludge mixture. Separation of the weak acid is accomplished by settling for approximately 2-4 hours.

The acid is pumped off or drawn off from the bottom of the kettle and is reconcentrated. The yield of acid recovered amounts to approximately 50% of the total amount of acid used in the propane-acid treatment of the residual lube oil. The oil is pumped from the top of the kettle and is neutralized with an alkali, such as an equeous sodium hydroxide solution, and then is suitable for use as a commercial fuel.

The heavy residual sludge obtained at the interface of the oil-acid layers is not suitable for commercial fuel, but may be used as a subgrade fuel. As previously pointed out, it may also be used for a repeated treatment of lube oil sludge. This interface sludge containing sulfonated mineral oil may also be diluted with water and the mixture so obtained added to the water used for hydrolysis in a subsequent lube oil sludge treatment.

It will be understood that the above example is given for purposes of illustration only, and the sequence of steps and the quantities of materials employed specified therein may be varied without departing from the scope of the present invention. For example, the demulsifying agent may be added to the fluxed mixture before or during the hydrolysis step, but it is preferred to add it after the substantial completion of the hydrolysis.

The nature and objects of the present invention having been thus described, what is claimed as new and useful and is desired to be secured by Letters Patent is:

1. In the recovery of sulphuric acid from sulphuric acid sludges of mineral oils, the steps of fluxing the sludge with an inert fluxing liquid which does not vaporize in substantial amounts at the boiling point of water, adding sufficient water for hydrolysis of the sludge, adding to the hydrolysis mixture a water soluble agent capable of demulsifying water-in-oil emulsions and allowing the mixture to settle into layers one of which contains the recovered acid.

2. In the recovery of sulphuric acid from sulphuric acid sludges of mineral oils, the steps of fluxing the sludge with an oil miscible liquid which does not vaporize in substantial amounts at the boiling point of water, adding sufficient water for hydrolysis of the sludge, adding to the hydrolysis mixture a water soluble agent capable of demulsifying water-in-oil emulsions and allowing the mixture to settle into layers one of which contains the recovered acid.

3. In the recovery of sulphuric acid from sulphuric acid sludges of lube oils the steps of fluxing the sludge with a mineral oil cut lighter than the lube oil which does not vaporize substantially at the boiling point of water, adding sufficient water for hydrolysis of the sludge, adding to the hydrolysis mixture a water soluble agent capable of demulsifying water-in-oil emulsions and allowing the mixture to settle into layers one of which contains the recovered acid.

4. A method according to claim 3 in which the fluxing agent is a sulphuric acid refined oil.

5. A method for recovering sulphuric acid from sulphuric acid sludges resulting from the treatment of mineral oils with sulphuric acid in the presence of a readily volatilizable diluent which comprises adding to the sludge containing the readily volatilizable diluent an inert fluxing liquid which does not vaporize in substantial amounts at the boiling point of water, evaporating the readily volatilizable diluent from the mixture, adding sufficient water to the mixture for the hydrolysis of the sludge, adding to the mixture a water soluble agent capable of demulsifying water-in-oil emulsions, the mixture being maintained for a period after the addition of the water at a temperature suitable for the hydrolysis of sulphuric esters and allowing the mixture to settle into layers one of which contains the recovered acid.

6. A method according to claim 5 in which the readily volatilizable diluent is propane.

7. A method according to claim 5 in which the inert fluxing liquid is a sulphuric acid refined mineral oil.

8. A method acording to claim 1 in which the water soluble agent is a sulfonated mineral oil.

9. A method according to claim 5 in which the water soluble agent is a sulfonated mineral oil.

10. A method for recovering sulphuric acid from a sulphuric acid sludge obtained by the treatment of a lube oil stock with sulphuric acid in the presence of propane which comprises adding acid refined heavy naphtha to the solution containing propane, depropanizing the mixture, heating the depropanized mixture to a temperature in the neighborhood of the boiling point of water, adding sufficient water to the mixture to effect hydrolysis of sulphuric esters contained therein, adding to the mixture a water soluble agent capable of demulsifying water-in-oil emulsions and allowing the mixture to settle whereupon three layers are formed, the lower layer being dilute sulphuric acid, the upper layer being fuel oil and the intermediate layer being sludge containing the demulsifying agent.

11. A method according to claim 10 in which the sludge layer containing the demulsifying agent is recycled to the hydrolyzing stage of a subsequent batch of lube oil sludge.

JOHN A. O'DELL.